(12) United States Patent
Dudar (10) Patent No.: US 10,363,833 B2
(45) Date of Patent: Jul. 30, 2019

(54) INDUCTIVE CHARGING ACTIVE SUSPENSION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 142 days.

(21) Appl. No.: 15/459,652

(22) Filed: Mar. 15, 2017

(65) Prior Publication Data

US 2018/0264963 A1 Sep. 20, 2018

(51) Int. Cl.
| | |
|---|---|
| *B60L 11/18* | (2006.01) |
| *B60L 9/00* | (2019.01) |
| *H02J 50/10* | (2016.01) |
| *H02J 7/00* | (2006.01) |
| *B60L 53/36* | (2019.01) |
| *H02J 7/02* | (2016.01) |
| *B60L 53/12* | (2019.01) |
| *B60L 53/38* | (2019.01) |
| *B60L 53/60* | (2019.01) |
| *H02J 50/90* | (2016.01) |
| *H02J 50/80* | (2016.01) |

(52) U.S. Cl.
CPC .............. *B60L 53/36* (2019.02); *B60L 53/12* (2019.02); *B60L 53/38* (2019.02); *B60L 53/60* (2019.02); *H02J 7/025* (2013.01); *H02J 50/10* (2016.02); *H02J 50/80* (2016.02); *H02J 50/90* (2016.02); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .............. B60L 11/1833; B60L 11/1838; B60L 11/1829; B60L 11/182; H02J 7/025
See application file for complete search history.

(56) References Cited

U.S. PATENT DOCUMENTS

| | | | |
|---|---|---|---|
| 7,151,997 B2 | 12/2006 | Uhlmann et al. | |
| 9,236,758 B2 | 1/2016 | Fisher | |
| 9,536,197 B1 * | 1/2017 | Penilla | ................... G06N 5/025 |

(Continued)

FOREIGN PATENT DOCUMENTS

| | | |
|---|---|---|
| DE | 102012217779 A1 | 4/2014 |
| GB | 2500691 A | 10/2013 |

(Continued)

OTHER PUBLICATIONS

GB Search Report dated Aug. 20, 2018 re GB Appl. No. 1803932.1.

*Primary Examiner* — Alan D Hutchinson
(74) *Attorney, Agent, or Firm* — Frank A. MacKenzie; Charles A. Bieneman (57) ABSTRACT

A vehicle computer includes a processor and a memory storing processor-executable instructions. The processor is programmed to determine a target charging height based on charging information received from a remote server and adjust a height of an inductive pick-up in a host vehicle in accordance with the target charging height prior to an inductive charging process.

21 Claims, 4 Drawing Sheets

(56) References Cited

U.S. PATENT DOCUMENTS

| | | | |
|---|---|---|---|
| 2011/0285349 A1* | 11/2011 | Widmer | B60L 11/182 |
| | | | 320/108 |
| 2012/0262002 A1 | 10/2012 | Widmer et al. | |
| 2014/0095026 A1* | 4/2014 | Freitag | B60L 11/1829 |
| | | | 701/37 |
| 2015/0061897 A1 | 3/2015 | Kees et al. | |
| 2015/0133152 A1* | 5/2015 | Edge | G01S 5/0236 |
| | | | 455/456.1 |
| 2015/0224845 A1 | 8/2015 | Anderson et al. | |
| 2016/0275400 A1* | 9/2016 | Hodges | G06N 5/04 |

FOREIGN PATENT DOCUMENTS

| | | |
|---|---|---|
| GB | 2510124 A | 7/2014 |
| JP | 2012191721 A | 10/2012 |

* cited by examiner

INDUCTIVE CHARGING ACTIVE SUSPENSION

BACKGROUND

Certain electric vehicles, such as plug-in hybrid electric vehicles (PHEV), can be charged by plugging a power cord into an outlet. Electrical energy from the outlet is used to charge the on-board vehicle battery. The vehicle has a power converter to convert AC energy from the outlet to DC energy used to charge the battery.

DETAILED DESCRIPTION

Inductively charging electric vehicles, including hybrid electric vehicles, is an alternative to physically plugging a vehicle power cord into an outlet. With inductive charging, the electric vehicle is parked over a charging mat. Electrical energy provided to the charging mat charges the battery of the electric vehicle through induction. Specifically, an inductive pick-up located on the electric vehicle receives the inductive charge.

The height of the inductive pick-up, relative to the charging mat, on the electric vehicle can affect the quality of the charge received. Charge quality is generally reduced the further the inductive pick-up is from the charging mat. The height of the inductive pick-up is often limited by the dimensions of the vehicle. Taller vehicles, such as trucks and SUVs, will likely have the inductive pick-up further from the charging mat than shorter vehicles, like mid-size sedans. Even vehicles of similar size (e.g., two mid-size sedans) may not have the inductive pick-up at the same height. Thus, even vehicles of the same class (compact, mid-size, crossover, etc.) may not receive the same charge quality despite using the same charging mat.

One way to improve the charge quality is with an inductive charging system that uses crowd-sourced information to adjust the active suspension system to a target charging height. Inductive charging is often more efficient when the inductive pick-up is approximately 6-10 inches from the charging mat. Knowing the height of the inductive pick-up on a host vehicle, the inductive charging system may command the active suspension to raise or lower the host vehicle so that the inductive pick-up is within that range relative to the charging mat. Not all charging mats have the same range, however. Therefore, the inductive charging system may use crowd-sourced information (i.e., data from other vehicles that have received a charge from a particular charging mat including the height of the other vehicle that received the most efficient charge from that particular charging mat). The inductive charging system may filter the crowd-sourced information to vehicles of a particular class, make, model, year, or a combination thereof.

An example vehicle computer that improves charge quality includes a processor a memory storing processor-executable instructions. The processor is programmed to determine a target charging height based on charging information received from a remote server and adjust a height of an inductive pick-up in a host vehicle in accordance with the target charging height prior to an inductive charging process. The charge information may include a plurality of potential charging heights, each associated with a charge efficiency. In this circumstance, the processor is programmed to determine the target charging height by selecting, from among the plurality of potential charging heights, the potential charging height with a highest charge efficiency. Alternatively, the processor may be programmed to determine the target charging height by determining one of a mean, median, and mode of the potential charging heights and selecting the mean, median, or mode of the potential charging heights as the target charging height.

The processor may be programmed to query the remote server for the charging information. The query may include a unique identifier of a charging station and a request for charging information associated with a classification size of the host vehicle, a make, model, and year of the host vehicle, and a battery capacity of the host vehicle.

The processor may be programmed to determine a height adjustment for the host vehicle based at least in part on the target charging height. To determine the height adjustment, the processor may be programmed to determine a present height of the inductive pick-up and a target height of the inductive pick-up, wherein the height adjustment is a difference of the present height and the target height. The processor may be programmed to command a suspension system controller to adjust a height of the host vehicle by the height adjustment. Alternatively, the processor may be programmed to command at least one suspension system actuator to adjust a height if the host vehicle by the height adjustment.

The processor may be programmed to determine a predicted charge quality based on the charging information. The predicted charge quality may represent a quality of the charge the host vehicle is expected to receive during the inductive charging process. The processor may be programmed to monitor an actual charge quality during the inductive charging process, compare the predicted charge quality to the actual charge quality, determine that the actual charge quality is lower than the predicted charge quality, and adjust a height of the host vehicle in real time during the inductive charging process until the actual charge quality is equal to or greater than the predicted charge quality.

The processor may be programmed to adjust a height of the host vehicle in real time during the inductive charging process, monitor an actual charge quality at each height including determining an efficiency of the inductive charge process at each height, and select the height of the host vehicle with a highest efficiency as an actual charging height. The processor may be programmed to command a communication interface to transmit the actual charging height to the remote server.

The processor may be programmed to determine when the inductive charging process is complete. Upon such a determination, the processor may be programmed to command one of a suspension system controller and at least one of a plurality of actuators to return the host vehicle to a pre-charge height after the inductive charging process is complete.

The processor may be programmed to determine an actual charging height used during the inductive charging process.

The actual charging height may be based on the height of the inductive pick-up when receiving a highest efficiency charge from a charging station. The processor may be programmed to store the actual charging height in the memory and relate the actual charging height in the memory to a unique identifier of the charging station stored in the memory.

The processor may be programmed to command a communication interface to transmit post-charge information to the remote server. The post-charge information may include an actual charge quality, an actual charging height, vehicle information, a unique identifier of a charging station, a battery capacity of the host vehicle, and an amount of time to complete the charge.

An example method includes receiving charging information from a remote server, wherein the charging information is associated with an electric vehicle charging station, determining a target charging height based on the charging information received from the remote server, and adjusting a height of an inductive pick-up in a host vehicle in accordance with the target charging height prior to an inductive charging process.

When the charge information includes a plurality of potential charging heights, each associated with a charge efficiency, determining the target charging height may include selecting, from among the plurality of potential charging heights, the potential charging height with a highest charge efficiency.

The method may further include querying the remote server for the charging information. The query may include a unique identifier of the charging station and a request for charging information associated with a classification size of the host vehicle, a make, model, and year of the host vehicle, and a battery capacity of the host vehicle.

The method may further include determining a height adjustment for the host vehicle based at least in part on the target charging height. Determining the height adjustment may include determining a present height of the inductive pick-up and a target height of the inductive pick-up. The height adjustment is a difference of the present height and the target height. In this case, adjusting the height of the inductive pick-up may include adjusting the height of the host vehicle by the height adjustment.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1A:
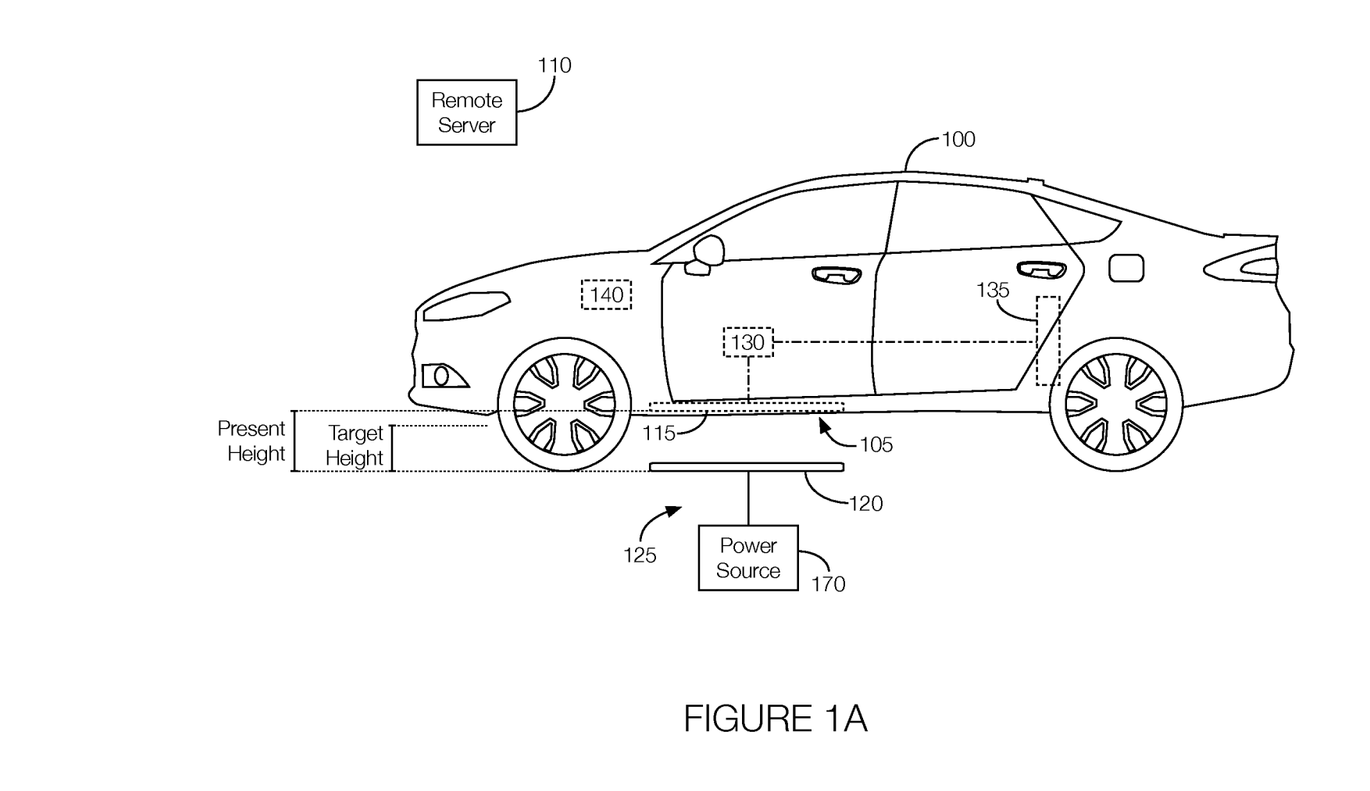
FIGS. 1A and 1B illustrate an example vehicle with an inductive charging system that uses crowd-sourced information to adjust an active suspension system from a present height (FIG. 1A) to a target charging height (FIG. 1B).
Figure 1B:
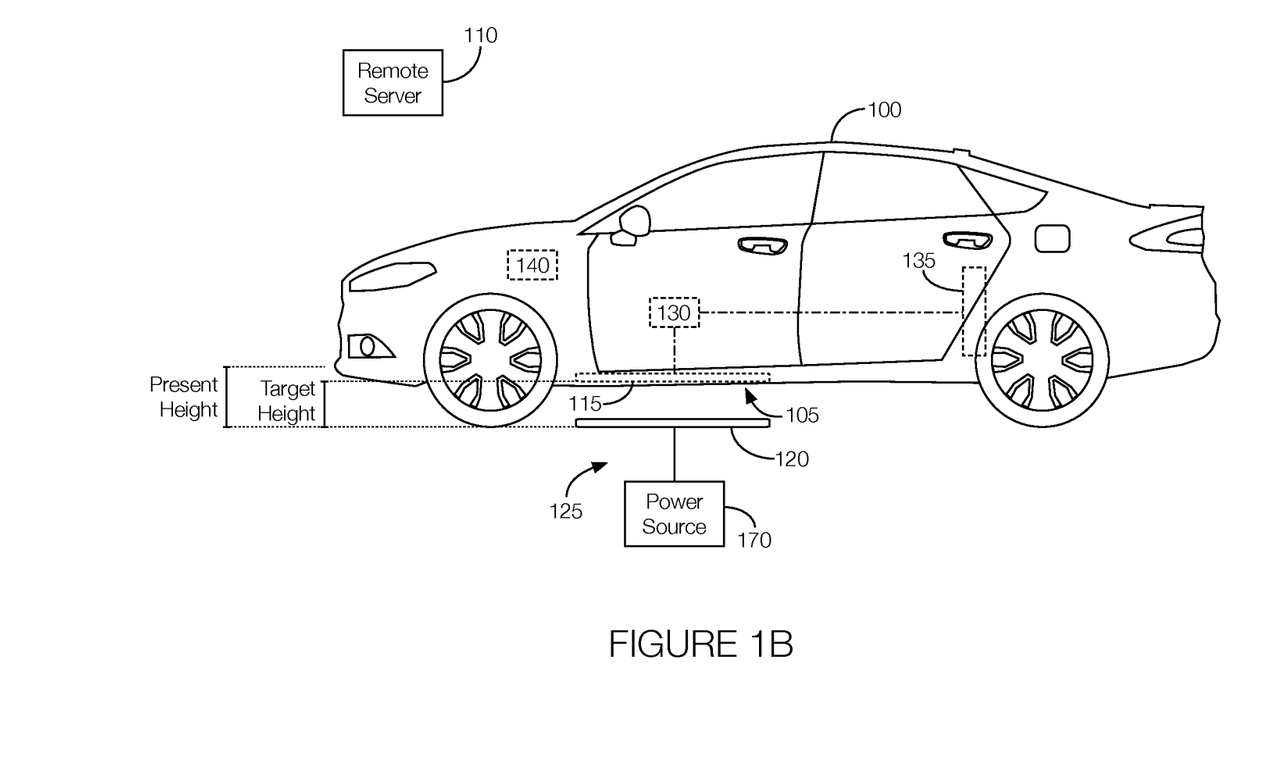

FIGS. 1A and 1B illustrate a host vehicle 100. Although illustrated as a sedan, the host vehicle 100 may include any passenger or commercial automobile such as a car, a truck, a sport utility vehicle, a crossover vehicle, a van, a minivan, a taxi, a bus, etc.

The host vehicle 100 includes an inductive charging system 105 that receives charging information from a remote server 110, determines a target charging height based on the charging information, and adjusts a height of an inductive pick-up 115 in the host vehicle 100 according to the target charging height prior to an inductive charging process. The inductive pick-up 115 includes coils for receiving an inductive charge from a charging mat 120 located at a charging station 125. The charging mat 120 is electrically connected to a power source 170, such as an alternating current (AC) power source. During the inductive charging process, the charging mat 120 transfers electrical energy to the inductive pick-up 115 via induction. The electrical energy received by the inductive pick-up 115 may be output to a rectifier circuit that converts the AC energy to direct current (DC) energy that can be used by an energy management system 130 to charge the vehicle battery 135. The inductive charging system 105 may be part of or separate from the energy management system 130. In some possible implementations, the inductive charging system 105 may be part of or separate from an adjustable suspension system 140 that can control the height of the inductive pick-up 115 by, e.g., adjusting the ground clearance of the host vehicle 100 (e.g., the space underneath the body of the host vehicle 100).

The inductive charging system 105 may identify the charging station 125 prior to arrival at the charging station 125 or upon arrival at the charging station 125. That is, the charging station 125 may be identified by a user input provided to a user input device (e.g., a touchscreen display located in the host vehicle 100), received via the vehicle telematics unit, or the like. In some instances, the host vehicle 100 may be assigned to the charging station 125 by a fleet owner or charging station 125 manager. When assigned to the charging station 125, the host vehicle 100 may wirelessly receive, via the telematics unit, a message with the unique identifier associated with the charging station 125. Alternatively, the charging station 125 may be identified according to the location of the host vehicle 100. If the host vehicle 100 is already at the charging station 125, the charging station 125 may be identified according to the GPS coordinates of the host vehicle 100.

The remote server 110 is implemented via circuits, chips, or other electronic components that stores the charging information and transmits the charging information to the inductive charging system 105. The remote server 110 is in wireless communication with the host vehicle 100. For instance, the remote server 110 may wirelessly communicate with a telematics unit incorporated into the host vehicle 100. The telematics unit is implemented via circuits, chips, or other electronic components that wirelessly communicate with the remote device according to any number of wireless telecommunication protocols. As discussed in greater detail below, the telematics unit may provide an interface between the inductive charging system 105 and the remote server 110.

The remote server 110 may store the charging information in a database. The charging information may be based on data collected by multiple vehicles that have used the same charging station 125 as the host vehicle 100. The data may be collected individually by the vehicles and transmitted to the remote server 110. The data collected and stored in the database may further indicate the quality of the charge received via the charging station 125. The quality of the charge may indicate the amount of time it took to complete the charge, whether the transfer of electrical energy was continuous or periodically disrupted, weather conditions (humidity, precipitation, etc.) at the time of the charge, etc. Other information stored in the database may include the unique identifier of the charging station 125, the capacity of the battery in each of the vehicles, the amount of time it took to complete the charge, the year, make, and model of each vehicle, or the like. The remote server 110 may be programmed to exclude outlier data and charge heights from vehicles that experienced a poor quality of charge.

Prior to arriving at a charging station 125, and before the inductive charging process begins, the inductive charging system 105 may query the remote server 110 for charging information for the charging station 125. The inductive charging system 105 may use the result of the query to determine a target charging height for the charging mat 120 at the charging station 125. In other words, the inductive charging system 105 may consider which charge heights from previous uses of the charging station 125 resulted in the most efficient charge. Since not all vehicles have the same height, battery capacity, etc., the inductive charging system 105 may query the remote server 110 to return charging information based on a subset of information, stored in the database, most likely relevant to determining the target charging height for charging the battery 135 of the host vehicle 100 at the charging station 125. For instance, the inductive charging system 105 may query the remote server 110 for charging information according to the unique identifier of the charging station 125, the year, make, and model of the host vehicle 100, and the capacity of the battery 135 of the host vehicle 100. The result of this query would allow the inductive charging system 105 to base the target charging height on data collected by other vehicles that have used the same charging station 125, that have the same battery capacity as the battery 135 of the host vehicle 100, and that are of the same year, make, and model as the host vehicle 100. Thus, if the host vehicle 100 is a mid-size sedan, the inductive charging system 105 will not consider data collected by trucks or SUVs.

After determining the target charging height and before beginning the inductive charging process, the inductive charging system 105 adjusts the height of the inductive pick-up 115 to the target charging height. As discussed in greater detail below, the inductive charging system 105 may do so by outputting control signals to the adjustable suspension system 140, such as the suspension system controller 150 or actuators 145 incorporated into the suspension system that adjust the ground clearance of the host vehicle 100.

FIG. 1A shows the inductive pick-up 115 at one height (referred to as a "present height") and FIG. 1B shows the inductive pick-up 115 at another height (referred to as a "target height"). The present height and the target height may be measured from the ground to the bottom of the inductive pick-up (as shown in FIGS. 1A and 1B). Alternatively, the present height and the target height may be measured from the top of the charging mat 120.

The target height may or may not be the same as the target charging height. The target charging height may, in some instances, refer to ground clearance as opposed to the actual distance of the inductive pick-up 115 from the ground (i.e., the target height). Therefore, as discussed in greater detail below, the target height may be calculated from the target charging height if the target charging height refers to the amount of ground clearance instead of the actual height of the inductive pick-up 115 since the ground clearance and height of the inductive pick-up 115 may not be the same, and since some vehicles transmitting data to the remote server 110 may use ground clearance as a substitute for height of the inductive pick-up 115. Moreover, the target height may be calculated from the height of the host vehicle 100 if, e.g., the distance of the inductive pick-up 115 from the bottom of the body of the host vehicle 100 is known.

The inductive charging system 105 may monitor the charge quality during the inductive charging process. The charge quality may be monitored from signals output by the energy management system 130, and the signals may indicate how well the inductive pick-up 115 is receiving electrical energy via induction from the charging mat 120. Further, the inductive charging system 105 may adjust the height of the inductive pick-up 115, in real time, and monitor whether the change in height has improved the charge quality. The inductive charging system 105 may continue to make such adjustments during the charging process until the charge quality is maximized (i.e., the inductive charging system 105 finds the height of the inductive pick-up 115 where the charge quality is greatest). When the charge process is complete, the inductive charging system 105 may, through the telematics unit, send a message to the remote server 110 indicating that the actual charging height used by the host vehicle 100, along with other information such as the amount of time it took to complete the charge, whether the transfer of electrical energy was continuous or periodically disrupted, weather conditions (humidity, precipitation, etc.) at the time of the charge, the unique identifier of the charging station 125, the capacity of the battery 135 in the host vehicle 100, the amount of time it took to complete the charge, the year, make, and model of the host vehicle 100, or the like. That way, other vehicles may benefit from the data collected by the host vehicle 100, including the iterative adjustments made during the inductive charging process.

After the inductive charging process has completed, the host vehicle 100 may return to a pre-charging height, which may be the height shown in FIG. 1A.

Figure 2:
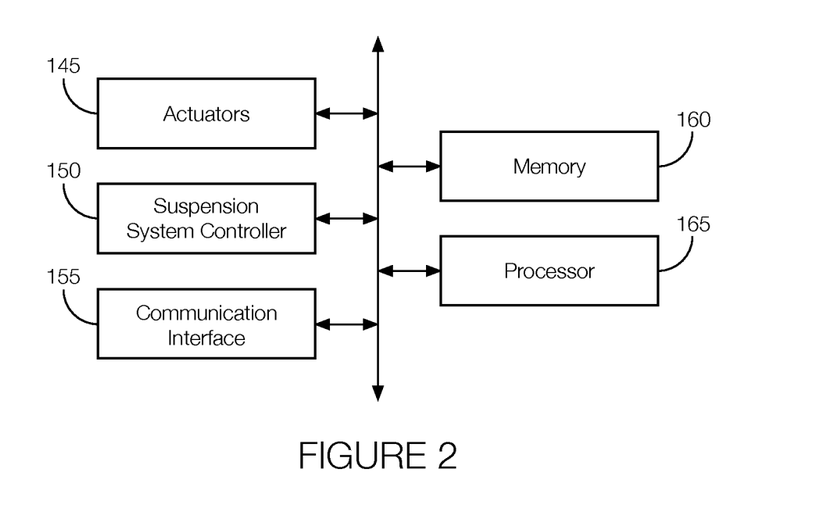
FIG. 2 is a block diagram showing example components of the vehicle, including example components of the inductive charging system.

FIG. 2 is a block diagram illustrating certain components of the host vehicle 100, including example components of the inductive charging system 105. The components of FIG. 2 include actuators 145, a suspension system controller 150, a communication interface 155, a memory 160, and a processor 165.

Each actuator 145 is controlled by control signals output by the processor 165 the suspension system controller 150, or another controller in the host vehicle 100. The actuator 145 may convert control signals into mechanical motion. For instance, the actuators 145 may raise or lower part of the host vehicle 100. Raising and lowering the host vehicle 100 may create more or less ground clearance, respectively. Further, raising and lowering the host vehicle 100 may change the distance between the inductive pick-up 115 and the charging station 125. Any number of actuators 145 may be used to raise and lower the host vehicle 100. For instance, the host vehicle 100 may include at least four actuators 145, at least one associated with each wheel. The actuators 145 may individually actuate to lift different parts of the host vehicle 100. Examples of actuators 145 may include a linear actuator 145, a servo motor, or the like.

The suspension system controller 150 is implemented via a microprocessor, circuits, chips, or other electronic components that executes instructions related to the operation of the vehicle suspension system. The vehicle suspension system may refer to the tires, springs, shock absorbers, and linkages that connect the wheels to the host vehicle 100. The suspension system may be tuned to balance vehicle handling with bump and noise reduction. In an active suspension system, the suspension system controller 150 controls the stiffness of the suspension, which refers to how much the suspension system absorbs bumps, etc. Controlling the stiffness of the suspension can also be used to control the ground clearance. That is, stiffening the suspension can increase the ground clearance and reducing the stiffness of the suspension can reduce the ground clearance. As such, stiffening the suspension may cause the inductive pick-up 115 to move away from the charging mat 120 and softening the suspension may cause the inductive pick-up 115 to move toward the charging mat 120. The suspension system controller 150 may be programmed to control the stiffness of the suspension system according to signals received from the processor 165, as discussed in greater detail below.

The communication interface 155 is implemented via an antenna, circuits, chips, or other electronic components that facilitate wireless communication between the host vehicle 100 and the remote server 110. The communication interface 155 may be programmed to query the remote server 110 for the charging information. For instance, the processor 165 may command the communication interface 155 to query the remote server 110 for the charging information, and the communication interface 155 may execute the command by generating a message with the query to the remote server 110. The communication interface 155 may receive a response, with charging information, from the remote server 110 and store the charging information in the memory 160, forward the charging information to the processor 165 for processing, or both. The communication interface 155 may be further programmed to transmit post-charge information to the remote server 110 at the instruction of the processor 165. The post-charge information may include an actual charge quality, a predicted charge quality, the target charging height, an actual charging height, vehicle information, the unique identifier of the charging station 125, a battery capacity, an amount of time to complete the charge. The remote server 110 may incorporate the post-charge information into the database. The communication interface 155 may be programmed to communicate in accordance with any number of wired or wireless communication protocols. For instance, the communication interface 155 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc. In some instances, the communication interface 155 is incorporated into a vehicle telematics unit.

The memory 160 is implemented via circuits, chips or other electronic components and can include one or more of read only memory 160 (ROM), random access memory 160 (RAM), flash memory 160, electrically programmable memory 160 (EPROM), electrically programmable and erasable memory 160 (EEPROM), embedded MultiMediaCard (eMMC), a hard drive, or any volatile or non-volatile media etc. The memory 160 may store instructions executable by the processor 165 and data such as charging information. The instructions and data stored in the memory 160 may be accessible to the processor 165 and possibly other components of the inductive charging system 105, of the host vehicle 100, or both. For instance, other components that may access the memory 160 include the suspension system controller 150, the communication interface 155, etc.

The processor 165 is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor 165 may be standalone device or incorporated into a vehicle controller, such as suspension system controller 150. The processor 165 is programmed to access and execute instructions stored in the memory 160. The processor 165 is programmed to determine a target charging height based on charging information received from the remote server 110 and adjust a height of the inductive pick-up 115 in the host vehicle 100 in accordance with the target charging height prior to an inductive charging process.

The processor 165 may be programmed to determine the target charging height from the charging information received from the remote server 110. The charging information may identify multiple potential charging heights, and each may be associated with a charging efficiency (i.e., the efficiency of the charge received at that charging height). The processor 165 may be programmed to process the charging information to determine which potential charging heights from previous uses of the charging station 125 resulted in the most efficient charge. The processor 165 may be programmed to select the mean, median, or mode of the potential charging heights of the charging information as the target charging height. Alternatively, the charge information may include a single charge height determined by the remote server 110. In that instance, the processor 165 may be programmed to select that charge height as the target charging height.

Since not all vehicles have the same height, battery capacity, etc., the processor 165 may be programmed to query the remote server 110 to return charging information based on a subset of information stored in the database. The processor 165 may be programmed to command the communication interface 155 to query the remote server 110 for the charging information. The query may identify the charging station 125 via a unique identifier associated with the charging station 125. The unique identifier may be a combination of alphanumeric characters. In some instances, the unique identifier represents a location of the charging station 125. The location may include coordinates, such as Global Positioning System (GPS) coordinates of the charging station 125. The processor 165 may be programmed to command the communication interface 155 to generate the query to request particular charging information from the remote server 110. The query may request charging information, for the charging station 125, associated with vehicles of the same classification size as the host vehicle 100. Examples of classification size may include sedan, coupe, compact, mid-size, cross-over, truck, minivan, etc. The query may request charging information, for the charging station 125, associated with vehicles of a certain year, make, model, etc., including vehicles of the same year, make, and model as the host vehicle 100. The query may request charging information, for the charging station 125, associated with an expected charging time. That is, the query may request the battery capacity of other vehicles that have used the charging station 125, the states of charge of those batteries when they began charging at the charging station 125, the amount of time for the charging station 125 to complete the charge of those batteries, etc. The processor 165 may use that or other information to determine the expected charging time given, e.g., the capacity of the battery 135 of the host vehicle 100, the present battery state of charge, etc.

In some instances, such as if the remote server 110 returns charging information for vehicles of various makes, models, battery capacity, etc., the processor 165 may be programmed to filter the charging information for relevant information that the processor 165 can used to determine the target charging height. The processor 165 may filter the charging information according to that of vehicles of a similar make, model, battery capacity, etc., and calculate the target charging height based on that subset of the charging information.

The processor 165 may be programmed to calculate a height adjustment based at least in part on the target charging height. That is, the processor 165 may be programmed to calculate the present height of the inductive pick-up 115 based on, e.g., a present height of the host vehicle 100. For instance, the processor 165 may calculate the present height of the inductive pick-up 115 by adding the present height of the host vehicle 100 to the distance of the inductive pick-up 115 to the bottom of the body of the host vehicle 100. The processor 165 may be programmed to determine the present height of the host vehicle 100 from signals output by the suspension system controller 150.

The processor 165 may be programmed to calculate the target height of the inductive pick-up 115 based on the target charging height determined from the charging information. In some instances, the processor 165 is programmed to calculate the target height of the inductive pick-up 115 to be the same as the target charging height. For instance, the processor 165 may be programmed to do so if the target charging height is based on the heights of inductive pick-ups from other vehicles. If the target charging height is based on the ground clearance of other vehicles while charging, the processor 165 may be programmed to determine the target height of the inductive pick-up 115 by adding the distance of the inductive pick-up 115 from the bottom of the host vehicle 100 to the target charging height.

The processor 165 may be programmed to determine a difference (i.e., the height adjustment) between the target height and the present height. For instance, the processor 165 may subtract the target height from the present height. The difference may be a positive number or a negative number. A positive difference may indicate that the inductive pick-up 115 needs to be lowered. A negative number may indicate that the inductive pick-up 115 needs to be raised. The processor 165 may be programmed to command the suspension system controller 150 to adjust the suspension system according to the difference. That is, the processor 165 may command the suspension system controller 150 to either raise or lower the host vehicle 100 (i.e., increase or decrease the ground clearance) by the distance. Doing so will move the inductive pick-up 115 the same distance and direction.

One way to command the suspension system controller 150 to adjust the height of the inductive pick-up 115 includes the processor 165 being programmed to generate a control signal that is based on the distance and direction the inductive pick-up 115 needs to move to be at the target height. The control signal may represent the difference between the target height and the present height (i.e., the height adjustment). The processor 165 may output the control signal to the suspension system controller 150, which may be programmed to adjust the suspension system, and thus, the height of the inductive pick-up 115, according to the distance represented by the control signal. That is, the suspension system controller 150 may output signals to command the actuators 145 to adjust the stiffness of the suspension to either raise or lower the body of the host vehicle 100.

Instead of commanding the suspension system controller 150 to adjust the height of the inductive pick-up 115, the processor 165 may be programmed to command the actuators 145 to adjust the stiffness of the suspension system. That is, the processor 165 may be programmed to output the control signal to the actuators 145 instead of to the suspension system controller 150.

The inductive charging processor 165 may begin after the inductive pick-up 115 is at the target height. In some instances, the processor 165 may be programmed to adjust the height of the inductive pick-up 115 before the host vehicle 100 arrives at the charging mat 120 (e.g., while the host vehicle 100 is moving). In other instances, the processor 165 may be programmed to wait to adjust the height of the host vehicle 100 until the host vehicle 100 is at a stop over the charging mat 120. The processor 165 may be programmed to wait until the inductive pick-up 115 is at the target height and that the host vehicle 100 is stopped and turned off before initiating the inductive charging process.

Further, the processor 165 may be programmed to determine a predicted charge quality based on the charging information. That is, the processor 165 may be programmed to predict the quality of the charge the host vehicle 100 should receive given the charging information, which as discussed above is based on the quality of the charges received by other vehicles at the same charging station 125. Moreover, the processor 165 may be programmed to monitor an actual charge quality during the inductive charging process. The processor 165 may be programmed to receive signals output by the energy management system 130 and monitor the actual charge quality according to those signals. The processor 165 may be programmed to quantify both the actual charge quality and the predicted charge quality, compare the quantified actual charge quality to the quantified predicted charge quality, and determine that the actual charge quality is lower than the predicted charge quality (indicating that the battery 135 of the host vehicle 100 was not charged as efficiently as the batteries of the previous vehicles to use the charging station 125). When the actual charge quality is lower than the predicted charge quality, the processor 165 may be programmed to adjust the height of the inductive pick-up 115 in real-time during the inductive charging process. The processor 165 may be programmed to continue to receive and monitor the actual charge quality while adjusting the height of the inductive pick-up 115. When the actual charge quality and the predicted charge quality are substantially the same (e.g., within 5-10% of one another), the processor 165 may keep the height of the inductive pick-up 115 constant. In another possible approach, the processor 165 may continually adjust the height of the inductive pick-up 115, in real-time, until the actual charge quality is equal to or greater than the predicted charge quality or until a predetermined number of different heights (e.g., 5-20 different heights) have been tested. The processor 165 may be programmed to return the height of the inductive pick-up 115 to the height associated with the most efficient charge. That is, the processor 165 may be programmed to return the height of the inductive pick-up 115 to the height where the actual charge quality was highest, which could include a height where the actual charge quality exceeded the predicted charge quality. The height that is determined to provide the most efficient charge may be referred to as the "actual charging height."

The processor 165 may be programmed to determine when the inductive charging process is complete based on signals output by, e.g., the energy management system 130. As a result of determining that the inductive charging process is complete, the processor 165 may be programmed to command the communication interface 155 to transmit post-charge information to the remote server 110 after the inductive charging process is complete. The post-charge information may include the actual charge quality, the predicted charge quality, the target charging height, the actual charging height, vehicle information such as the year, make, and model of the host vehicle 100, the unique identifier of the charging station 125, the battery capacity of the host vehicle 100, the amount of time to complete the charge, or any combination thereof.

After the inductive charging process is complete, the processor 165 may be programmed to command the suspension system controller 150 or actuators 145 to return the inductive pick-up 115 to the pre-charging height. The processor 165 may be programmed to output such a command while the host vehicle 100 is stopped and before the host vehicle 100 is driven away from the charging station 125.

Further, the processor 165 may be programmed to store the actual charging height in the memory 160. In some possible approaches, the processor 165 may relate the actual charging height to the unique identifier of the charging station 125 in a database stored in the memory 160. That way, the processor 165 may simply use the actual charging height as the target charging height the next time the host vehicle 100 is at that charging station 125 without having to query the remote server 110. Moreover, the processor 165 may be programmed to identify trends based on the actual charging heights used at various charging stations 125. That is, the processor 165 may be programmed to determine the mean, median, or mode of the collection of actual charging heights stored in the database and use that instead of querying the remote server 110, in instances where the remote server 110 is not available, or where the remote server 110 does not have charging information for a particular charging station 125.

Figure 3:
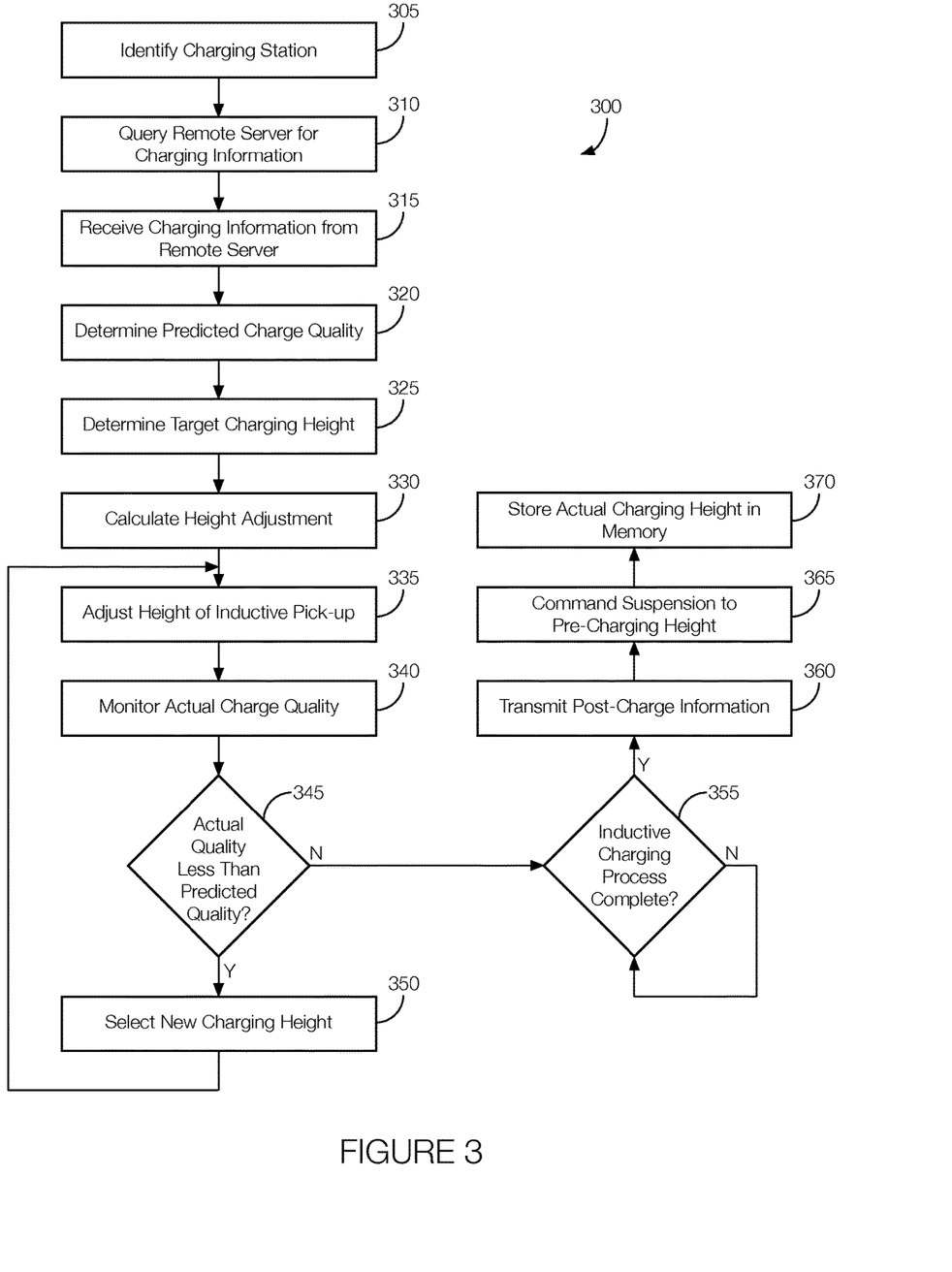
FIG. 3 is a flowchart of an example process that may be executed by the inductive charging system to adjust the active suspension system according to the crowd-sourced information received.

FIG. 3 is a flowchart of an example process 300 that may be executed by the inductive charging system 105 to adjust the active suspension system according to the crowd-sourced information received. The process 300 may begin prior to the host vehicle 100 arriving at a charging station 125. The process 300 may continue to execute until after the inductive charging process is complete, even if the host vehicle 100 is turned off during the inductive charging process.

At block 305, the inductive charging system 105 identifies the charging station 125. The charging station 125 may be identified by a user input provided to a user input device (e.g., a touchscreen display located in the host vehicle 100), received via the telematics unit or communication interface 155, or the like. In some instances, the host vehicle 100 may be assigned to the charging station 125. When assigned to the charging station 125, the host vehicle 100 may receive the unique identifier associated with the charging station 125. Alternatively, the charging station 125 may be identified according to the location of the host vehicle 100. That is, if the host vehicle 100 is already at the charging station 125, the charging station 125 may be identified according to the GPS coordinates of the host vehicle 100.

At block 310, the inductive charging system 105 queries the remote server 110 for the charging information. The processor 165 may command the communication interface 155 to query the remote server 110 for the charging information. The query may identify the charging station 125 via a unique identifier associated with the charging station 125. The unique identifier may be a combination of alphanumeric characters. In some instances, the unique identifier represents a location of the charging station 125. The location may include coordinates, such as Global Positioning System (GPS) coordinates of the charging station 125. The processor 165 may command the communication interface 155 to generate the query to request particular charging information from the remote server 110. The query may request charging information, for the charging station 125, associated with vehicles of the same classification size as the host vehicle 100. Examples of classification size may include sedan, coupe, compact, mid-size, cross-over, truck, minivan, etc. The query may request charging information, for the charging station 125, associated with vehicles of a certain year, make, model, etc., including vehicles of the same year, make, and model as the host vehicle 100. The query may request charging information, for the charging station 125, associated with an expected charging time. That is, the query may request the battery capacity of other vehicles that have used the charging station 125, the states of charge of those batteries when they began charging at the charging station 125, the amount of time for the charging station 125 to complete the charge of those batteries, etc.

At block 315, the inductive charging system 105 receives charging information from the remote server 110. The charging information may be received by the communication interface 155. The communication interface 155 may store the charging information in the memory 160, forward the charging information to the processor 165 for processing, or both. The charging information may be responsive to the query. Alternatively, the charging information received may be for various makes and models of vehicles.

At block 320, the inductive charging system 105 determines a predicted charge quality based on the charge information. For instance, the processor 165 may predict the quality of the charge the host vehicle 100 should receive given the charging information, which as discussed above is based on the quality of the charges received by other vehicles at the same charging station 125.

At block 325, the inductive charging system 105 determines the target charging height based on the charging information. The processor 165, for instance, may determine a target charging height based on charging information received from the remote server 110. The processor 165 may process the charging information, extract the heights of other vehicles when using the charging station 125 identified at block 305. If the charging information identifies multiple potential charging heights, the processor 165 may select the potential charging height with the highest charge efficiency as the target charging height. In other instances, the processor 165 may determine the mean, median, or mode of the potential charging heights, and select the mean, median, or mode of the potential charging height as the target charging height. Alternatively, the charge information may include a single charge height determined by the remote server 110. In that instance, the processor 165 may select that charge height as the target charging height. In instances where the target charging height is unattainable (e.g., the suspension system controller 150 cannot lower or raise the host vehicle 100 to the target charging height because the host vehicle 100 is too tall or too short), the processor 165 may select the target charging height to be the maximum (or minimum) height of the host vehicle 100. This may be mitigated by the processor 165 only considering charge information for similarly sized vehicles. Alternatively, the process 300 may return to block 305 or 310 so a different charging station 125 can be selected. For instance, the processor 165 may query the remote server 110 for a stronger charging station, which could include querying the remote server 110 for a charging station with associated charging information for similarly sized vehicles as the host vehicle 100.

At block 330, the induction charging system calculates a height adjustment based at least in part on the target charging height. To determine the height adjustment, the processor 165 may calculate the present height of the inductive pick-up 115 based on, e.g., a present height of the host vehicle 100, which the processor 165 may determine from signals output by the suspension system controller 150. The processor 165 may calculate the target height of the inductive pick-up 115 based on the target charging height determined from the charging information. In some instances, the processor 165 may calculate the target height of the inductive pick-up 115 to be the same as the target charging height, which the processor 165 may do if the target charging height is based on the heights of inductive pick-ups from other vehicles. If the target charging height is based on the ground clearance of other vehicles while charging, the processor 165 may determine the target height of the inductive pick-up 115 by adding the distance of the inductive pick-up 115 from the bottom of the host vehicle 100 to the target charging height. The processor 165 may further determine a difference between the target height and the present height as the height adjustment. For instance, the processor 165 may subtract the target height from the present height. The difference (i.e., the height adjustment) may be a positive number or a negative number. A positive difference may indicate that the inductive pick-up 115 needs to be lowered. A negative number may indicate that the inductive pick-up 115 needs to be raised.

At block 335, the inductive charging system 105 adjusts the height of the inductive pick-up 115 according to the target charging height. The processor 165 may adjust the height of the inductive pick-up 115 prior to the host vehicle 100 arriving at the charging station 125, prior to the beginning of the inductive charging process, or both. The processor 165 may adjust the height of the inductive pick-up 115 by commanding the suspension system controller 150 to move the host vehicle 100 up or down by the height adjustment. That is, the processor 165 may generate a control signal that is based on the distance and direction the inductive pick-up 115 needs to move to be at the target height. The processor 165 may output the control signal to the suspension system controller 150, which may be programmed to adjust the suspension system, and thus, the height of the inductive pick-up 115, according to the distance represented by the control signal. Instead of commanding the suspension system controller 150 to adjust the height of the inductive pick-up 115, the processor 165 may command the actuators 145 to adjust the stiffness of the suspension system. That is, the processor 165 may output the control signal to the actuators 145 instead of to the suspension system controller 150.

At block 340, the inductive charging system 105 monitors the actual charge quality during the inductive charging process. The processor 165 may monitor the actual charge quality during the inductive charging process by receiving and processing signals output by the energy management system 130. The processor 165 may quantify both the actual charge quality and the predicted charge quality.

At decision block 345, the inductive charging system 105 compares the predicted charge quality to the actual charge quality. If the actual charge quality is lower than the predicted charge quality (indicating that the battery 135 of the host vehicle 100 was not charged as efficiently as the batteries of the previous vehicles to use the charging station 125), the process 300 may proceed to block 350. If the actual charge quality and the predicted charge quality are substantially the same (e.g., within 5-10% of one another), the process 300 may proceed to block 355. If the actual quality is not substantially the same or greater than the predicted charge quality after a predetermined number of iterations (each iteration representing a different height), the processor 165 may adjust the inductive pick-up 115 to the height associated with the most efficient charge, where the actual charge quality was highest. In such circumstances, the process 300 may proceed to block 355. Alternatively, the process 300 may return to block 305 or 310 so a different charging station 125 can be selected, especially if the host vehicle 100 is too large for the charging station 125 (e.g., a pickup truck might be too large for a charging station 125 tuned to charge cars). Upon returning to block 305 or 310, the processor 165 may query the remote server 110 for a stronger charging station, which could include querying the remote server 110 for a charging station with associated charging information for similarly sized vehicles as the host vehicle 100.

At block 350, the inductive charging system 105 selects a new target charging height. For instance, the processor 165 may select a different target charging height, and the process 300 may return to block 335 where the height of the inductive pick-up 115 is adjusted according to the newly selected target charging height.

At decision block 355, the inductive charging system 105 determines if the inductive charging operation is complete. The processor 165 may determine when the inductive charging process is complete based on signals output by, e.g., the energy management system 130. If the inductive charging process is complete, the process 300 proceeds to block 360. Otherwise, block 355 continues to execute.

At block 360, the inductive charging system 105 transmits post-charge information to the remote server 110. For instance, the processor 165 may command the communication interface 155 to transmit the post-charge information to the remote server 110. The post-charge information may include the actual charge quality, the predicted charge quality, the target charging height, the actual charging height, vehicle information such as the year, make, and model of the host vehicle 100, the unique identifier of the charging station 125, the battery capacity of the host vehicle 100, the amount of time to complete the charge, or any combination thereof.

At block 365, the inductive charging system 105 commands the suspension system to return to a pre-charging height. In one possible approach, the processor 165 may command the suspension system controller 150 or actuators 145 to return the inductive pick-up 115 to the pre-charging height. The processor 165 may output such a command while the host vehicle 100 is stopped and before the host vehicle 100 is driven away from the charging station 125.

At block 370, the inductive charging system 105 stores the actual charging height in the memory 160. For example, the processor 165 may upload the actual charging height to the database stored in the memory 160. In doing so, the processor 165 may relate the actual charging height to the unique identifier of the charging station 125

The process 300 may end after block 370.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
a processor; and
a memory storing processor-executable instructions, wherein the processor is programmed to
determine a target charging height based on charging information received from a remote server, including a predicted quality of charge based on prior charges at a charging station,
adjust a height of an inductive pick-up in a host vehicle in accordance with the target charging height prior to an inductive charging process,
determine an actual charging height used during the inductive charging process, wherein the actual charging height is based on the height of the inductive pick-up when receiving a highest efficiency charge from a charging station; and
store the actual charging height in the memory and relate the actual charging height in the memory to a unique identifier of the charging station stored in the memory.

2. The vehicle computer of claim 1, wherein the charge information includes a plurality of potential charging heights, each associated with a charge efficiency, and wherein the processor is programmed to determine the target charging height by selecting, from among the plurality of potential charging heights, the potential charging height with a highest charge efficiency.

3. The vehicle computer of claim 1, wherein the charge information includes a plurality of potential charging heights, each associated with a charge efficiency, and wherein the processor is programmed to determine the target charging height by determining one of a mean, median, and mode of the potential charging heights and selecting the mean, median, or mode of the potential charging heights as the target charging height.

4. The vehicle computer of claim 1, wherein the processor is programmed to query the remote server for the charging information, the query including a unique identifier of a charging station and a request for charging information associated with a classification size of the host vehicle, a make, model, and year of the host vehicle, and a battery capacity of the host vehicle.

5. The vehicle computer of claim 1, wherein the processor is programmed to determine a height adjustment for the host vehicle based at least in part on the target charging height.

6. The vehicle computer of claim 5, wherein, to determine the height adjustment, the processor is programmed to determine a present height of the inductive pick-up and a target height of the inductive pick-up, where in the height adjustment is a difference of the present height and the target height.

7. The vehicle computer of claim 5, wherein the processor is programmed to command a suspension system controller to adjust a height of the host vehicle by the height adjustment.

8. The vehicle computer of claim 5, wherein the processor is programmed to command at least one suspension system actuator to adjust a height of the host vehicle by the height adjustment.

9. The vehicle computer of claim 1, wherein the processor is programmed to monitor an actual charge quality during the inductive charging process, compare the predicted charge quality to the actual charge quality, determine that the actual charge quality is lower than the predicted charge quality, and adjust a height of the host vehicle in real time during the inductive charging process until the actual charge quality is equal to or greater than the predicted charge quality.

10. The vehicle computer of claim 1, wherein the processor is programmed to adjust a height of the host vehicle in real time during the inductive charging process, monitor an actual charge quality at each height including determining an efficiency of the inductive charge process at each height, and select the height of the host vehicle with a highest efficiency as an actual charging height.

11. The vehicle computer of claim 10, wherein the processor is programmed to command a communication interface to transmit the actual charging height to the remote server.

12. The vehicle computer of claim 1, wherein the processor is programmed to determine when the inductive charging process is complete and command one of a suspension system controller and at least one of a plurality of actuators to return the host vehicle to a pre-charge height after the inductive charging process is complete.

13. The vehicle computer of claim 1, wherein the processor is programmed to command a communication interface to transmit post-charge information to the remote server, the post-charge information including an actual charge quality, an actual charging height, vehicle information, a unique identifier of a charging station, a battery capacity of the host vehicle, and an amount of time to complete the charge.

14. A method comprising:
receiving charging information about prior charges at a charging station from a remote server, wherein the charging information is associated with an electric vehicle charging station;
determining a target charging height based on the charging information received from a remote server, including a predicted quality of charge, received from the remote server; and
adjusting a height of an inductive pick-up in a host vehicle in accordance with the target charging height prior to an inductive charging process;
determining an actual charging height used during the inductive charging process, wherein the actual charging height is based on the height of the inductive pick-up when receiving a highest efficiency charge from a charging station; and
storing the actual charging height and relate the actual charging height to a unique identifier of the charging station.

15. The method of claim 14, wherein the charge information includes a plurality of potential charging heights, each associated with a charge efficiency, and wherein determining the target charging height includes selecting, from among the plurality of potential charging heights, the potential charging height with a highest charge efficiency.

16. The method of claim 14, further comprising querying the remote server for the charging information, the query including a unique identifier of the charging station and a request for charging information associated with a classification size of the host vehicle, a make, model, and year of the host vehicle, and a battery capacity of the host vehicle.

17. The method of claim 14, further comprising:
determining a height adjustment for the host vehicle based at least in part on the target charging height, wherein determining the height adjustment includes determining a present height of the inductive pick-up and a target height of the inductive pick-up, wherein the height adjustment is a difference of the present height and the target height; and
wherein adjusting the height of the inductive pick-up includes adjusting the height of the host vehicle by the height adjustment.

18. A vehicle computer comprising:
a processor; and
a memory storing processor-executable instructions,
wherein the processor is programmed to determine a target charging height based on charging information received from a remote server, adjust a height of an inductive pick-up in a host vehicle in accordance with the target charging height prior to an inductive charging process, command a communication interface to transmit post-charge information to the remote server, the post-charge information including an actual charge quality, an actual charging height, vehicle information, a unique identifier of a charging station, a battery capacity of the host vehicle, and an amount of time to complete the charge.

19. The vehicle computer of claim 18, wherein the charge information includes a plurality of potential charging heights, each associated with a charge efficiency, and wherein the processor is programmed to one of:
(a) determine the target charging height by selecting, from among the plurality of potential charging heights, the potential charging height with a highest charge efficiency; or
(b) determine the target charging height by determining one of a mean, median, and mode of the potential charging heights and selecting the mean, median, or mode of the potential charging heights as the target charging height.

20. The vehicle computer of claim 18, wherein the processor is programmed to monitor the actual charge quality during the inductive charging process, compare the predicted charge quality to the actual charge quality, determine that the actual charge quality is lower than the predicted charge quality, and adjust a height of the host vehicle in real time during the inductive charging process until the actual charge quality is equal to or greater than the predicted charge quality.

21. The vehicle computer of claim 18, wherein the processor is programmed to determine an actual charging height used during the inductive charging process, wherein the actual charging height is based on the height of the inductive pick-up when receiving a highest efficiency charge from a charging station.

* * * * *